United States Patent
Kitano et al.

(10) Patent No.: US 9,677,649 B2
(45) Date of Patent: Jun. 13, 2017

(54) HYDRAULIC AUTO-TENSIONER

(71) Applicant: NTN CORPORATION, Osaka (JP)

(72) Inventors: Satoshi Kitano, Shizuoka (JP); Tadahisa Tanaka, Shizuoka (JP); Eiji Maeno, Shizuoka (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 15/023,094

(22) PCT Filed: Sep. 16, 2014

(86) PCT No.: PCT/JP2014/074377
§ 371 (c)(1),
(2) Date: Mar. 18, 2016

(87) PCT Pub. No.: WO2015/045941
PCT Pub. Date: Apr. 2, 2015

(65) Prior Publication Data
US 2016/0230854 A1    Aug. 11, 2016

(30) Foreign Application Priority Data
Sep. 26, 2013  (JP) .................................. 2013-199929

(51) Int. Cl.
*F16H 7/22* (2006.01)
*F16H 7/08* (2006.01)
*F16H 7/12* (2006.01)

(52) U.S. Cl.
CPC ... *F16H 7/1236* (2013.01); *F16H 2007/0806* (2013.01); *F16H 2007/0814* (2013.01); *F16H 2007/0893* (2013.01)

(58) Field of Classification Search
CPC ..... F16H 2007/0806; F16H 2007/0859; F16H 7/0836; F16H 7/0848; F16H 2007/0814

(Continued)

(56) References Cited

U.S. PATENT DOCUMENTS

2005/0059517 A1* 3/2005 Poiret ..................... F01L 1/02
474/110
2005/0064970 A1* 3/2005 Tanaka .................. F16H 7/0836
474/110

(Continued)

FOREIGN PATENT DOCUMENTS

DE    10 2010 045 877    3/2012
DE    10 2011 004 486    8/2012

(Continued)

OTHER PUBLICATIONS

Extended European Search Report issued Jan. 23, 2017 in corresponding European Application No. 14847949.6.

(Continued)

*Primary Examiner* — Henry Liu
(74) *Attorney, Agent, or Firm* — Wenderoth, Lind & Ponack, L.L.P.

(57) ABSTRACT

A hydraulic auto-tensioner includes a plunger fitted to a bottom end portion of a rod so as to be slidable along a radially inner surface of a valve sleeve and a radially outer surface of the rod. The plunger has a bottom plate formed with a valve hole. A first leakage gap is defined between sliding surfaces of the plunger and the valve sleeve, and a second leakage gap of which the flow resistance is lower is defined between sliding surfaces of the plunger and the rod such that while the engine is running normally, oil in a pressure chamber leaks into a reservoir chamber through the second leakage gap, and when starting the engine by actuating a starter/generator, the plunger rises until the valve hole is closed so that oil in the pressure chamber leaks into the reservoir chamber through the first leakage gap.

16 Claims, 7 Drawing Sheets

(58) Field of Classification Search
USPC .......................................................... 474/110
See application file for complete search history.

(56) References Cited

U.S. PATENT DOCUMENTS

| | | | | |
|---|---|---|---|---|
| 2005/0130777 A1* | 6/2005 | Grunau | ................ | F16H 7/0848 |
| | | | | 474/110 |
| 2006/0003859 A1* | 1/2006 | Sato | ..................... | F16H 7/0836 |
| | | | | 474/110 |
| 2007/0155554 A1* | 7/2007 | Mineno | ................ | F16H 7/1236 |
| | | | | 474/110 |
| 2007/0270259 A1* | 11/2007 | Koch | .................... | F16H 7/0848 |
| | | | | 474/110 |
| 2008/0020876 A1* | 1/2008 | Tanaka | ................... | F16C 33/74 |
| | | | | 474/110 |
| 2008/0280712 A1* | 11/2008 | Ryouno | ............... | F16H 7/0836 |
| | | | | 474/110 |
| 2009/0298628 A1* | 12/2009 | Kawahara | ............ | F16H 7/1236 |
| | | | | 474/110 |
| 2010/0004080 A1* | 1/2010 | He | ..................... | F16K 17/0406 |
| | | | | 474/110 |
| 2010/0075790 A1* | 3/2010 | Hartmann | ............ | F16H 7/0836 |
| | | | | 474/110 |
| 2010/0087284 A1* | 4/2010 | Norimatsu | ........... | F16H 7/0836 |
| | | | | 474/110 |
| 2010/0099528 A1* | 4/2010 | Hartmann | ............ | F16H 7/0836 |
| | | | | 474/110 |
| 2010/0105506 A1* | 4/2010 | Rointru | ................ | F16H 7/0836 |
| | | | | 474/110 |
| 2010/0120564 A1* | 5/2010 | Hartmann | ............ | F16H 7/1236 |
| | | | | 474/110 |
| 2010/0267503 A1* | 10/2010 | Hartmann | ............ | F16H 7/0836 |
| | | | | 474/110 |
| 2011/0263366 A1* | 10/2011 | Botez | ................... | F16H 7/0848 |
| | | | | 474/110 |
| 2012/0040790 A1* | 2/2012 | Perissinotto | .......... | F16H 7/0836 |
| | | | | 474/110 |
| 2012/0202628 A1* | 8/2012 | Six | ....................... | F16H 7/1236 |
| | | | | 474/110 |
| 2012/0252615 A1* | 10/2012 | Konuma | ............... | F16H 7/0848 |
| | | | | 474/110 |
| 2013/0017913 A1* | 1/2013 | Hartmann | ............. | F16H 7/0848 |
| | | | | 474/110 |
| 2013/0260931 A1* | 10/2013 | Sato | ......................... | F16H 7/12 |
| | | | | 474/110 |
| 2013/0303318 A1* | 11/2013 | Hofmann | ............. | F16H 7/0836 |
| | | | | 474/110 |
| 2013/0331212 A1* | 12/2013 | Kurematsu | ............... | F16H 7/08 |
| | | | | 474/110 |
| 2014/0057748 A1* | 2/2014 | Satomura | ............. | F16H 7/1236 |
| | | | | 474/110 |
| 2014/0200104 A1* | 7/2014 | Kurematsu | ............... | F16H 7/08 |
| | | | | 474/110 |
| 2014/0378253 A1* | 12/2014 | Tanaka | ................. | F16H 7/1236 |
| | | | | 474/110 |

FOREIGN PATENT DOCUMENTS

| | | |
|---|---|---|
| EP | 2 101 082 | 9/2009 |
| JP | 2001-289290 | 10/2001 |
| JP | 2009-191863 | 8/2009 |
| JP | 2009-222081 | 10/2009 |
| JP | 2009-264419 | 11/2009 |
| JP | 2009-275757 | 11/2009 |
| JP | 2010-276152 | 12/2010 |
| JP | 2011-27238 | 2/2011 |
| JP | 2012-241794 | 12/2012 |
| JP | 2012-251629 | 12/2012 |
| JP | 2013-142405 | 7/2013 |
| JP | 2013-151974 | 8/2013 |
| WO | 2012/019801 | 2/2012 |
| WO | 2013/119412 | 8/2013 |

OTHER PUBLICATIONS

International Search Report issued Dec. 16, 2014 in corresponding International Application No. PCT/JP2014/074377 (with English translation).

* cited by examiner

HYDRAULIC AUTO-TENSIONER

TECHNICAL FIELD

This invention relates to a hydraulic auto-tensioner used to adjust the tension of a belt for driving engine accessories such as an alternator, a water pump and a compressor of an air-conditioner.

BACKGROUND ART

In order to reduce carbon dioxide emissions, an engine is proposed on which is mounted an idle-stop mechanism including an integrated starter/generator (ISG) capable of stopping the engine when the vehicle comes to a stop, and instantly starting the engine when the accelerator pedal is depressed, allowing start of the vehicle.

FIG. 11(b) shows a belt transmission device for an engine on which is mounted an idle-stop mechanism including an ISG capable of both driving engine accessories and starting the engine. This belt transmission device includes a crankshaft pulley $P_1$ mounted to the crankshaft 1, a starter/generator pulley $P_2$ mounted to a rotary shaft of the starter/generator 2 of the ISG, an engine accessory pulley $P_3$ mounted to a rotary shaft of an engine accessory 3 such as a water pump, and a belt 4 trained around the pulleys $P_1$ to $P_3$, and is configured such that while the engine is running in a normal state as shown in FIG. 11(a), the starter/generator 2 and the engine accessory 3 are driven by the crankshaft pulley $P_1$, which is rotating in the direction of the arrow in FIG. 11(a). The starter/generator 2 serves as a generator at this time.

To start the engine, the starter/generator 2 is actuated, as a starter, to rotate the starter/generator pulley $P_2$ in the direction of the arrow in FIG. 11(b), thereby rotating the crankshaft pulley $P_1$.

This belt transmission device further includes a tension pulley 5 provided at a portion 4a of the belt 4 extending between the crankshaft pulley $P_1$ and the starter/generator pulley $P_2$ and rotatably supported by a pivotable pulley arm 6, and a hydraulic auto-tensioner A which applies an adjusting force to the pulley arm 6 so as to bias the pulley arm 6 in the direction in which the pulley arm 6 is pressed against the belt 4, thereby absorbing any change in the tension of the belt 4.

Conventional hydraulic auto-tensioners of this type are disclosed in the below-identified Patent documents 1 and 2. Either of these conventional hydraulic auto-tensioners includes a rod having its bottom end portion slidably inserted in a valve sleeve protruding from the bottom surface of a cylinder so as to define a pressure chamber in the valve sleeve; and return spring mounted between a spring seat provided at the top end portion of the rod and the bottom surface of the cylinder, and biasing the rod and the valve in the direction in which the rod protrudes from the valve sleeve.

Further, a sealed reservoir chamber is defined between the inner periphery of the cylinder and the outer periphery of the valve sleeve such that the lower portion of the reservoir chamber communicates with the lower portion of the pressure chamber through oil passages formed in the bottom surface portion of the cylinder; and a check valve is mounted in the bottom end portion of the valve sleeve such that when a push-in force is applied to the rod, and the pressure in the pressure chamber exceeds the pressure in the reservoir chamber, the check valve is closed, thereby blocking communication between the oil passages and the pressure chamber.

Each of these conventional hydraulic auto-tensioners further includes a coupling piece provided on the top surface of the spring seat and pivotally coupled to the engine block shown in FIG. 11(a), and a coupling piece provided on the bottom surface of the cylinder and coupled to the pulley arm 6 shown in FIG. 11(a). In this arrangement, when a push-in force is applied from the belt to the rod through the tension pulley 5 and the pulley arm 6, the check valve is closed, so that oil sealed in the pressure chamber flows into a leakage gap defined between the sliding surfaces of the valve sleeve and the rod, thereby generating a hydraulic damper force in the pressure chamber due to the viscous resistance of the oil flowing into the leakage gap, to damp the push-in force.

PRIOR ART DOCUMENTS

Patent Documents

Patent document 1: JP Patent Publication 2009-275757A
Patent document 2: JP Patent Publication 2012-241794A

SUMMARY OF THE INVENTION

Object of the Invention

Since such a conventional hydraulic auto-tensioner is configured such that when a push-in force is applied to the rod, oil in the pressure chamber is leaked into the single leakage gap defined between the sliding surfaces of the valve sleeve and the rod, it is impossible to apply suitable tension to the belt 4 both while the engine is running in a normal state and when starting the engine with the starter/generator 2.

In particular, if the leakage gap is sized such that the auto-tensioner can absorb changes in tension of the belt while the engine is running in a normal state, the leakage gap is so large in size that when starting the engine by actuating the starter/generator 2, the rod tends to be pushed in significantly, thus slackening the belt 4 to such an extent that slip occurs between the belt 4 and the pulleys $P_1$ to $P_3$. Such slip could shorten the life of the belt, and/or make it difficult to start the engine by actuating the starter/generator 2.

If, on the other hand, the leakage gap is sized such that the auto-tensioner can absorb changes in tension of the belt 4 when starting the engine by actuating the starter/generator 2, the leakage gap is so small that while the engine is running in a normal state, the belt 4 tends to become over-tensioned to such an extent as to cause damage to the belt 4 and bearings rotatably supporting the pulleys $P_1$ to $P_3$ are damaged, and/or increase fuel consumption.

An object of the present invention is to provide a hydraulic auto-tensioner which is capable of applying suitable tension to the above-mentioned belt both while the engine is running in a normal state and when starting the engine.

Means to Achieve the Object

In order to achieve this object, the present invention provides a hydraulic auto -tensioner comprising:

a cylinder including a bottom having a bottom surface, and a valve sleeve protruding from the bottom surface, the cylinder containing oil;

a rod having a bottom end portion inserted in the valve sleeve, thereby defining a pressure chamber in the valve sleeve, and provided with a spring seat at an upper portion of the rod;

a return spring mounted between the spring seat and the bottom surface of the cylinder, and biasing the cylinder and the rod in a direction in which the rod protrudes from the cylinder;

wherein an oil passage is defined at a bottom portion of the cylinder between an inner periphery of the cylinder and an outer periphery of the valve sleeve such that a lower portion of a reservoir chamber communicates with a lower portion of the pressure chamber through the oil passage; and a check valve mounted in a lower end portion of the valve sleeve, and configured to be closed when a pressure in the pressure chamber exceeds a pressure in the reservoir chamber, thereby blocking communication between the pressure chamber and the oil passage, wherein the auto-tensioner is configured such that when a push-in force is applied to the rod, the check valve is closed, causing oil in the pressure chamber to be leaked into the reservoir chamber such that the push-in force is damped by a hydraulic damper function by the oil in the pressure chamber, wherein the auto-tensioner further comprises:

a cylindrical plunger having a bottom plate at a lower portion of the plunger, and fitted to the bottom end portion of the rod so as to be slidable along a radially inner surface of the valve sleeve and a radially outer surface of the rod at the bottom end portion of the rod, wherein a first leakage gap is defined between sliding surfaces of the plunger and the valve sleeve;

an anti-separation means which prevents separation of the plunger from the rod with a gap defined between the bottom plate of the plunger and a bottom end surface of the rod; and an elastic member mounted inside the plunger, and biasing the plunger downward, the elastic member having a spring force smaller than a damper force generated by the first leakage gap, wherein the bottom plate of the plunger is formed with a valve hole having a valve seat above the valve hole, and configured to be closed when the valve seat is seated on the bottom end surface of the rod, and wherein a second leakage gap of which a flow resistance is lower than a flow resistance of the first leakage gap is provided inside of the plunger.

In adjusting the belt of a belt transmission device for driving engine accessories of an engine to which is mounted an idle-stopping mechanism of an ISG, using the above-described hydraulic auto-tensioner, the spring seat provided at the distal end of the rod is coupled to the object to which the tensioner is to be mounted, such as an engine block, and the cylinder is coupled to a pulley arm supporting a tension pulley such that the pulley arm is biased in the direction in which the tension pulley is pressed against the portion of the belt between the crankshaft pulley and the starter/generator pulley, thereby tensioning the belt.

With the hydraulic auto-tensioner mounted in the belt transmission device in this manner, when the tension of the belt increases while the engine is running normally, and a push-in force is applied to the rod from the belt, the pressure in the pressure chamber increases, so that the check valve is closed. As a result, oil in the pressure chamber flows through the valve hole into the plunger, and then leaks through the second leakage gap, which is lower in flow resistance into the reservoir chamber. A hydraulic damper force is generated in the pressure chamber due to the viscous resistance of the oil flowing through the second leakage gap such that the push-in force is damped by the hydraulic damper force, and the belt is maintained at a suitable tension.

When starting the engine by actuating the starter/generator, the tension of the belt increases sharply, and the pressure in the pressure chamber also increases sharply. As a result, the check valve is closed, and at the same time, the plunger rises against the spring force of the elastic member under the pressure of the oil in the pressure chamber, until the valve seat is seated on the bottom end surface of the rod and the valve hole is closed. Oil in the pressure chamber thus leaks into the reservoir chamber through the first leakage gap.

At this time, since the flow resistance by the first leakage gap is higher, oil leaks slowly, so that the pressure in the pressure chamber decreases only a little, and the hydraulic damper force in the pressure chamber is large enough to allow the rod to be pushed in only a little. As a result, the tension of the belt is maintained at a level necessary to drive the crankshaft while preventing slip between the belt and each of the pulleys.

The second leakage gap may comprise an annular gap defied between the sliding surfaces of the rod and the plunger. In this case, if the first leakage gap has a diametrical dimension of not less than 10 micrometers and less than 20 micrometers, and the second leakage gap has a diametrical dimension of not less than 20 micrometers and less than 60 micrometers, it is possible to apply suitable tension to the belt both while the engine is running normally and when starting the engine.

If the damper force generated by the second leakage gap is within a range of ½ to ½0 of the damper force generated by the first leakage gap, too, it is possible to apply suitable tension to the belt both while the engine is running normally and when starting the engine.

The plunger may be formed, in the lower portion thereof, with a circular recess having a top wall defined by the bottom plate of the plunger, wherein a fitted member is press-fitted in the recess, and the second leakage gap may be defined between the fitting surfaces of the fitted member and the recess, or formed in the fitted member.

In this arrangement, the second leakage gap may be any of a spiral groove, an orifice and a helical groove.

The elastic member of the hydraulic auto-tensioner according to this invention may comprise a coil spring or springs, a disk spring or springs, or a wave washer or washers.

The anti-separation means may comprise a ring groove formed in the inner periphery of the plunger at its upper portion, a snap ring fitted in the ring groove, and a stepped portion provided on the rod and capable of supporting the inner peripheral portion of the snap ring.

Advantages of the Invention

As described above, the hydraulic auto-tensioner according to the present invention is configured such that while the engine is running normally, oil in the pressure chamber is leaked into the reservoir chamber thorough the second leakage gap, of which the flow resistance is low, and when started the engine by actuating the starter/generator, the plunger rises under the pressure in the pressure chamber until the valve hole is closed so that oil in the pressure chamber is leaked into the reservoir chamber through the first leakage gap, of which the flow resistance is higher. Thus, it is possible to apply suitable tension to the belt both while the engine is running normally and when starting the engine.

BRIEF DESCRIPTION OF THE DRAWINGS

FIGS. 11(a) and 11(b) are front views of a belt transmission device for an engine including an idle-stop mechanism, of which FIG. 11(a) shows a state in which the engine is running in a normal state, and FIG. 11(b) shows a state when the engine is started by a starter/generator.

BEST MODE FOR EMBODYING THE INVENTION

Figure 1:
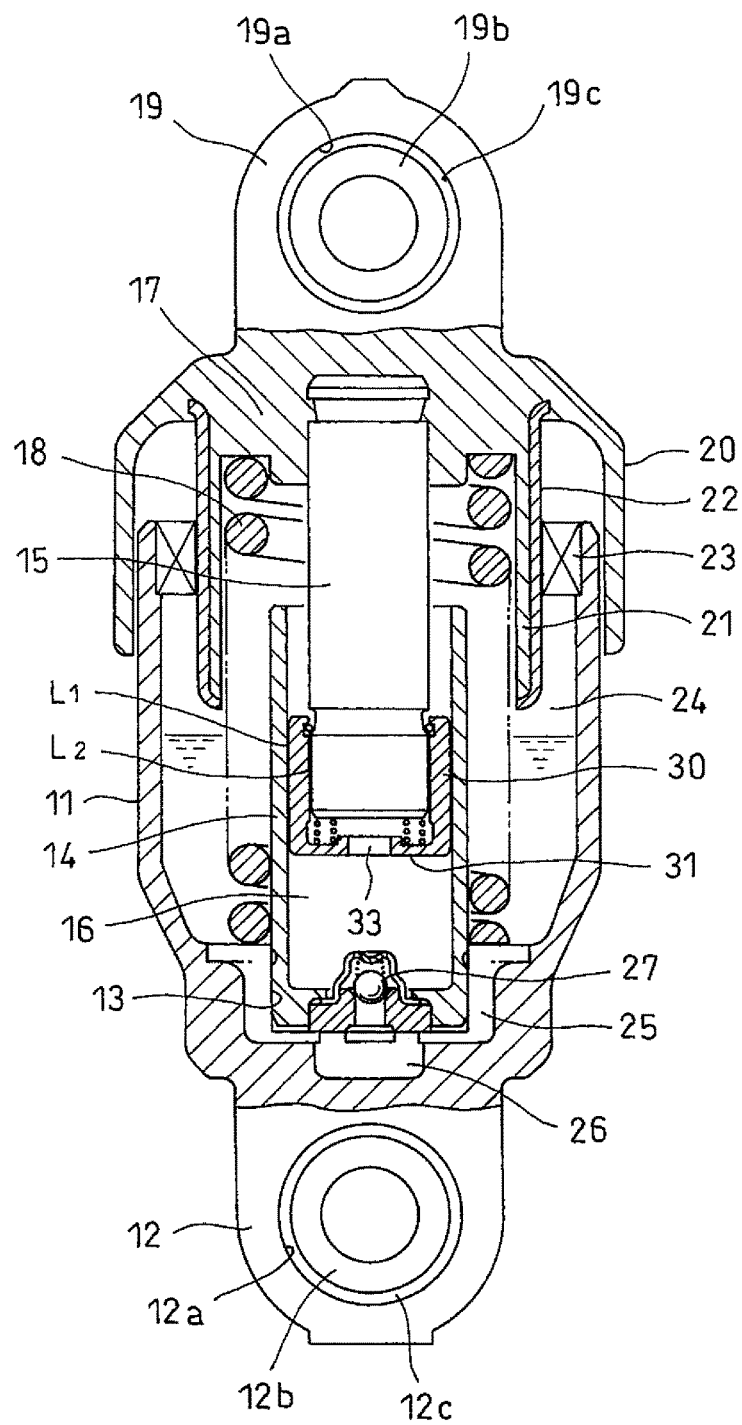
FIG. 1 is a vertical sectional view of a hydraulic auto-tensioner embodying the present invention.

Now the embodiment of the present invention is described with reference to the drawings. As shown in FIG. 1, the hydraulic auto -tensioner of the embodiment includes a cylinder 11 having a bottom portion having a lower surface provided with a coupling piece 12 to be coupled to the pulley arm 6 shown in FIG. 11(a).

The coupling piece 12 has a shaft inserting hole 12a which extends through the coupling piece 12 from one to the other side surface thereof, and in which are mounted a tubular pivot shaft 12b, and a slide bearing 12c rotatably supporting the pivot shaft 12b. By inserting a bolt through the pivot shaft 12b, threading the bolt into the pulley arm 6 and tightening it, the pivot shaft 12b is fixed in position such that the cylinder 11 is pivotable about the pivot shaft 12b.

The cylinder 11 has, in its inner bottom surface, a sleeve fitting hole 13 in which is press-fitted the bottom end of a steel valve sleeve 14. A rod 15 has its lower portion slidably inserted into the valve sleeve 14, thereby defining a pressure chamber 16 in the valve sleeve 14 under the rod 15.

A spring seat 17 is connected to the upper end portion of the rod 15 located outside of the cylinder 11. A return spring 18 is mounted between the spring seat 17 and the bottom surface of the cylinder 11, and biases the cylinder 11 and the rod 15 in the direction in which the rod 15 protrudes from the cylinder 11.

A coupling piece 19 to be coupled to an engine block is provided on the top end of the spring seat 17. The coupling piece 19 has a sleeve inserting hole 19a which extends through the coupling piece 19 from one to the other side surface thereof, and in which are mounted a sleeve 19b, and a slide bearing 19c rotatably supporting the sleeve 19b. The coupling piece 19 is rotatably coupled to the engine block by a bolt inserted through the sleeve 19b.

The spring seat 17 is formed by molding, and when molding the spring seat 17, a tubular dust cover 20 and a spring cover 21 are simultaneously molded so as to be integral with the spring seat 17 such that the dust cover 20 covers the outer periphery of the cylinder 11 at the upper portion of the cylinder 11, and the spring cover 21 covers the upper portion of the return spring 18.

The spring seat 17 may be formed by the casting of aluminum or molding a resin such as a heat-setting resin.

The entire outer periphery of the spring cover 21 is covered by a tubular member 22 inserted into the spring seat 17 when molding the spring seat 17. The tubular member 22 is formed by pressing a steel sheet.

An oil seal 23 as a seal member is mounted in the cylinder 11 at the top opening of the cylinder 11 such that the inner periphery of the oil seal 23 is in elastic contact with the outer peripheral surface of the tubular member 22, to close the top opening of the cylinder 11, thereby preventing leakage of oil in the cylinder and also preventing entry of dust into the cylinder 11.

The oil seal 23 defines a closed reservoir chamber 24 between the cylinder 11 and the valve sleeve 14. The reservoir chamber 24 communicates with the pressure chamber 16 through oil passages 25 defined between fitting surfaces of the sleeve fitting hole 13 and the valve sleeve 14, and an oil reservoir 26 in the form of a circular recess formed in the center of the bottom surface of the sleeve fitting hole 13.

A check valve 27 is mounted in the lower end portion of the valve sleeve 14. The check valve 27 closes when the pressure in the pressure chamber 16 exceeds the pressure in the reservoir chamber 24, thereby blocking communication between the pressure chamber 16 and the oil passages 25, and preventing oil in the pressure chamber 16 from flowing through the oil passages 25 into the reservoir chamber 24.

Figure 2:
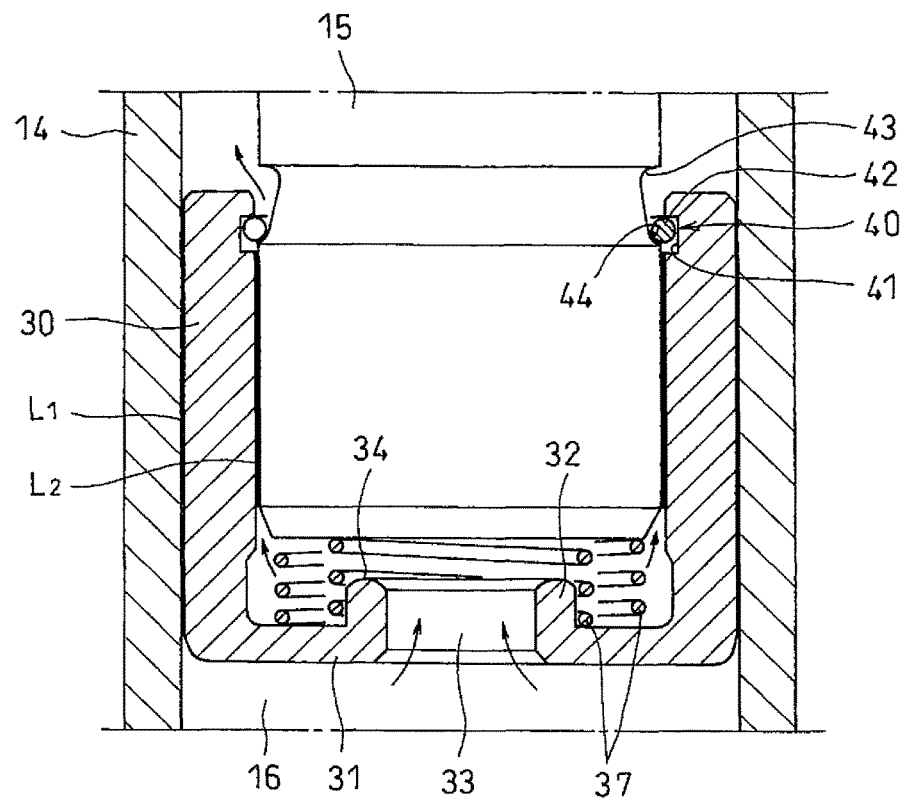
FIG. 2 is an enlarged sectional view of FIG. 1, showing a portion where a plunger is fitted.

As shown in FIGS. 1 and 2, a plunger 30 is fitted on the lower end portion of the rod 15 located in the valve sleeve 14. As shown in FIG. 2, the plunger 30 is a cylindrical member having a bottom plate 31 formed with a protrusion 32 at its central portion. The protrusion 32 is formed with a valve hole 33 extending vertically through the protrusion 32 along the axis of the protrusion 32.

Figure 4:
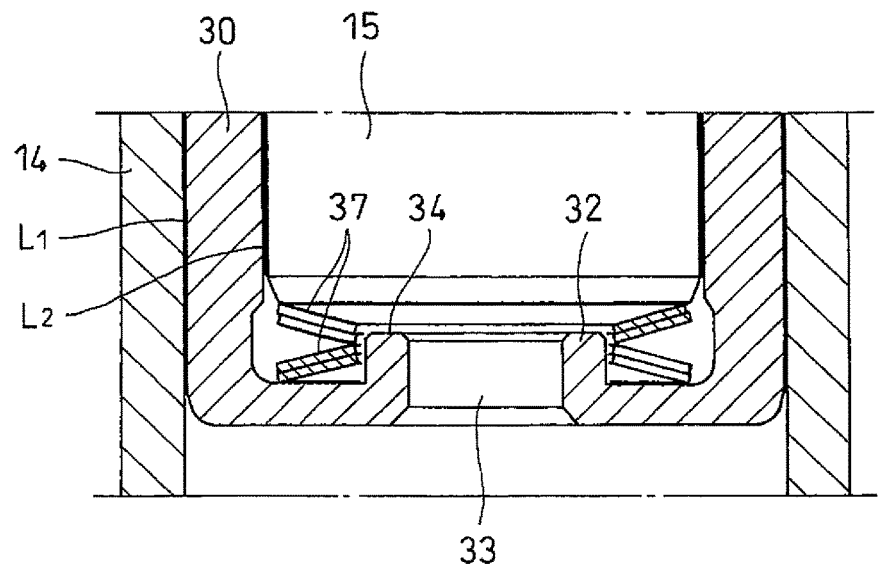
FIG. 4 is a sectional view showing a different elastic member biasing the plunger downward.
Figure 5:
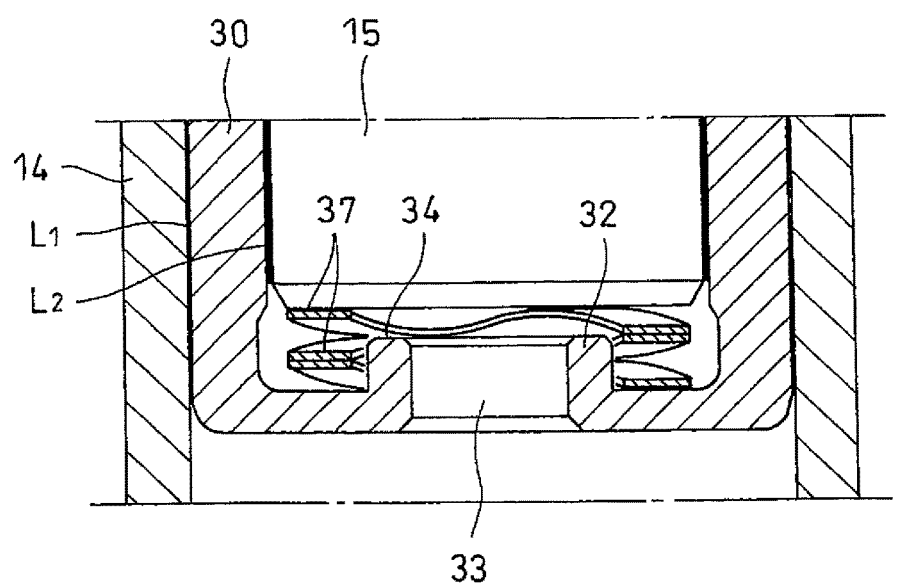
FIG. 5 is a sectional view showing a still different elastic member biasing the plunger downward.

The top surface of the protrusion 32 forms a valve seat 34, whereby when the valve seat 34 is seated on a flat bottom end surface of the rod 15, the valve hole 33 is closed. While the valve seat 34 shown has a circular arc section, a valve seat in the form of a flat surface, as shown in FIGS. 4 and 5, may be used instead.

The plunger 30 is slidable along the radially outer surface of the rod 15 and the radially inner surface of the valve sleeve 14. An annular gap which constitutes a first leakage gap $L_1$ is defined between the sliding surfaces of the plunger 30 and the valve sleeve 14. An annular gap which constitutes a second leakage gap $L_2$ is defined between the sliding surfaces of the plunger 30 and the rod 15.

The first leakage gap $L_1$ has a diametrical dimension of not less than 10 micrometers and less than 20 micrometers. The second leakage gap $L_2$ has a diametrical dimension of not less than 20 micrometers and less than 60 micrometers. The second leakage gap $L_2$ provides a lower flow resistance than does the second leakage gap $L_1$.

The plunger 30 is biased downward by an elastic member 37 mounted between the bottom end surface of the rod 15 and the bottom plate 31, and prevented from separating from the rod 15 by an anti-separation means 40 provided between the plunger 30 and the rod 15 with a gap defined between the valve seat 34 and the rod 15 and thus the valve hole 33 open.

In the above embodiment, the elastic member 37 comprises two coil springs having different diameters from each other, but it is not limited thereto. For example, the elastic member 37 may comprise disk springs shown in FIG. 4, or may comprise wave washers shown in FIG. 5. The spring force of the elastic member 37 is determined to be smaller than the damper force generated due to the first leakage gap $L_1$, and larger than the damper force generated due to the second leakage gap $L_2$.

The anti-separation means 40 includes a ring groove 41 formed in the inner periphery of the plunger 30 at its upper portion, a snap ring 42 fitted in the ring groove 41, and an annular groove 43 formed in the rod 15 and in which the inner peripheral portion of the snap ring 42 is engageable, whereby the plunger 30 is prevented from separation when the inner peripheral portion 44 of the snap ring 42 abuts a lower stepped portion of the annular groove 43.

Figure 11:
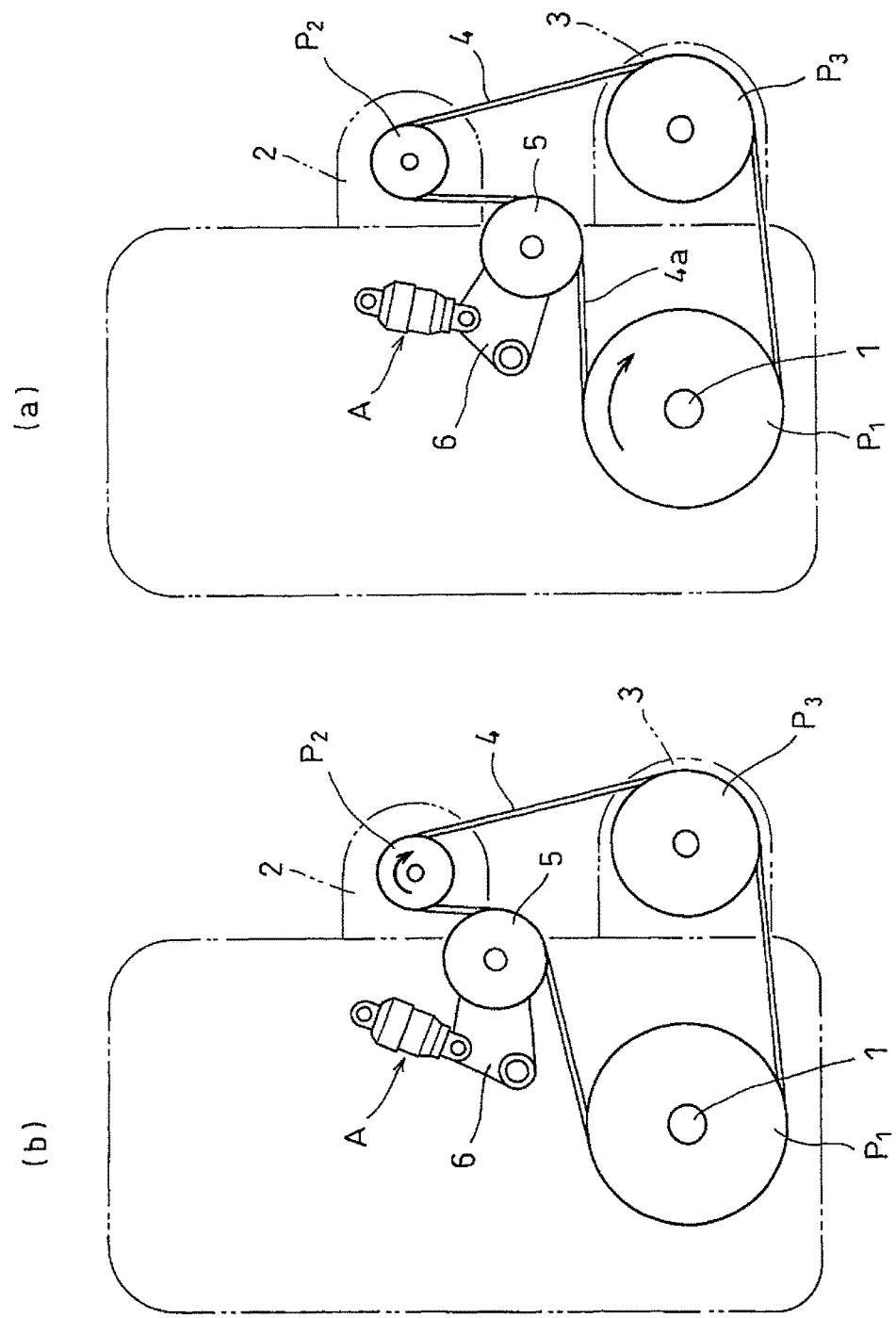

In mounting the auto-tensioner of the embodiment in the belt transmission device shown in FIG. 11(a), for driving the engine accessory of the engine having an idle-stopping function, the coupling piece 12, provided at the closed end of the cylinder 11, is coupled to the engine block, while the coupling piece 19 of the spring seat 17 is coupled to the pulley arm 6 such that the adjusting force of the auto-tensioner is applied to the pulley arm 6.

While the engine is running in a normal state with the tension of the belt 4 being adjusted in the above manner, the tension of the belt changes due e.g. to fluctuations in loads on the engine accessory 3. When the tension of the belt 4 decreases, the cylinder 11 and the rod 15 move relative to each other in the direction in which the rod 15 protrudes from the cylinder 11 under the biasing force of the return spring 18, thereby eliminating slackness of the belt 4.

When the cylinder 11 and the rod 15 move relative to each other in the direction in which the rod 15 protrudes from the cylinder 11, the pressure in the pressure chamber 16 drops below the pressure in the reservoir chamber 24, causing the check valve 27 to open. As a result, oil in the reservoir chamber 24 smoothly flows through the oil passages 25 and the oil reservoir 26 into the pressure chamber 16, allowing the cylinder 11 and the rod 15 to smoothly move relative to each other in the direction in which the rod 15 protrudes from the cylinder 11, so that slackness of the belt 4 is immediately removed.

When the tension of the belt 4 increases, a push-in force is applied from the belt 4 which tends to move the cylinder 11 and the rod 15 in the direction in which the rod 15 is retracted into the cylinder 11. Since the pressure in the pressure chamber 16 exceeds the pressure in the reservoir chamber 24 at this time, the check valve 27 is closed, so that oil in the pressure chamber 16 flows into the plunger 30 through the valve hole 33, and then leaks into the reservoir chamber 24 through the second leakage gap $L_2$. Due to viscous resistance of oil flowing through the second leakage gap $L_2$, hydraulic damper force is generated in the pressure chamber 16, which dampens the push-in force applied to the hydraulic auto-tensioner.

The size of the second leakage gap $L_2$ is determined such that the auto-tensioner can absorb fluctuations in tension of the belt 4 while the engine is running in a normal state, so that while the engine is running in a normal state, the auto-tensioner prevents over-tensioning of the belt 4 and thus maintains the tension of the belt at an suitable level.

Figure 3:
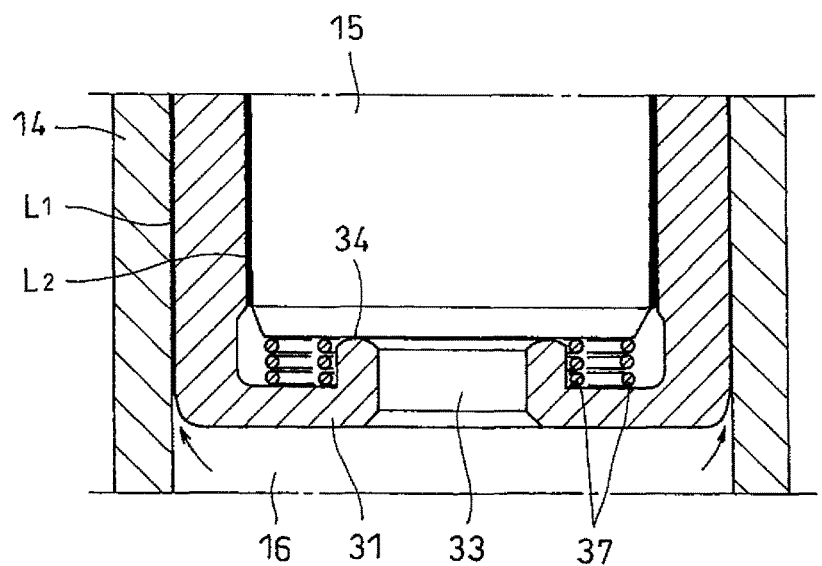
FIG. 3 is a sectional view showing a state in which a valve hole formed in a bottom plate of the plunger is closed.

When starting the engine by actuating a starter/generator 2, the tension of the belt 4 sharply increases and a large push-in force is applied to the rod 15. This sharply increases the pressure in the pressure chamber 16. As a result, the check valve 27 is closed, and simultaneously, the plunger 30 rises under the oil pressure in the pressure chamber 16 against the biasing force of the elastic member 37, until, as shown in FIG. 3, the valve seat 34 is seated on the bottom end surface of the rod 15, and the valve hole 33 is closed. In this state, oil in the pressure chamber 16 leaks into the reservoir chamber 24 through the first leakage gap $L_1$.

At this time, since the flow resistance by the first leakage gap $L_1$ is higher than the flow resistance by the second leakage gap $L_2$, oil leaks slowly into the reservoir chamber 24, so that the pressure in the pressure chamber 16 decreases only a little, and the hydraulic damper force in the pressure chamber 16 is large enough to allow the rod 15 to be pushed in only a little. As a result, the tension of the belt 4 is maintained at a level necessary to drive the crankshaft 1 while preventing slip between the belt 4 and each of the pulleys $P_1$ to $P_3$.

In FIG. 2, the second leakage gap $L_2$ is an annular gap defined between the sliding surfaces of the rod 15 and the plunger 30, but is not limited thereto. FIGS. 6 to 9 show different second leakage gaps $L_2$.

Figure 6:
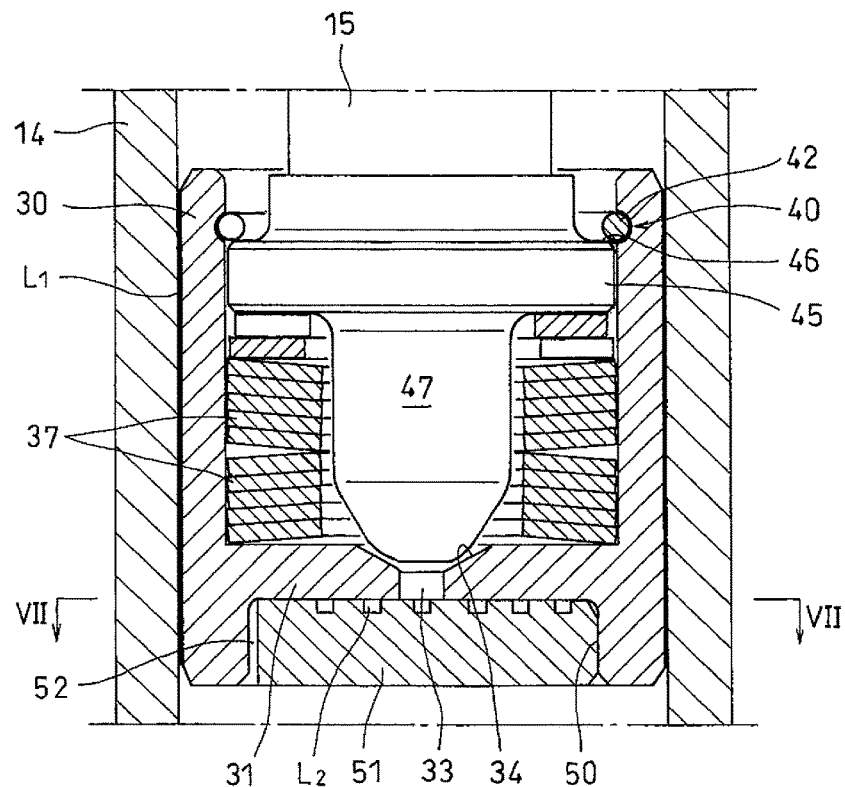
FIG. 6 is a sectional view showing a different second leakage gap.
Figure 7:
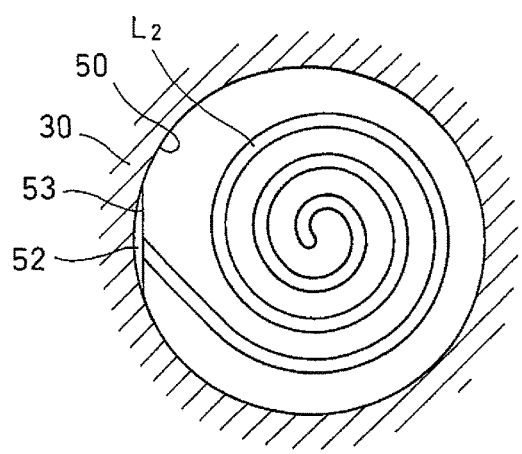
FIG. 7 is a sectional view taken along line VII -VII of FIG. 6.

In FIGS. 6 and 7, the plunger 30 has a bottom plate 31 at its bottom end portion, and is formed with a circular recess 50 of which the top wall is the bottom plate 31. A disk-shaped fitted member 51 is press-fitted in the recess 50. The fitted member 51 has a flat surface portion 53 such that a gap 52 is defined between the flat surface portion 53 and the radially inner surface of the circular recess 50. In this embodiment, the second leakage gap $L_2$ is a spiral groove which is formed in the top surface of the fitted member 51, and through which the gap 52 communicates with the valve hole 33.

While in FIG. 6, a spiral groove is formed in the top surface of the fitted member 51 as the leakage gap $L_2$, a spiral groove may be instead formed in the bottom surface of the bottom plate 31 as the leakage gap $L_2$.

Figure 8:
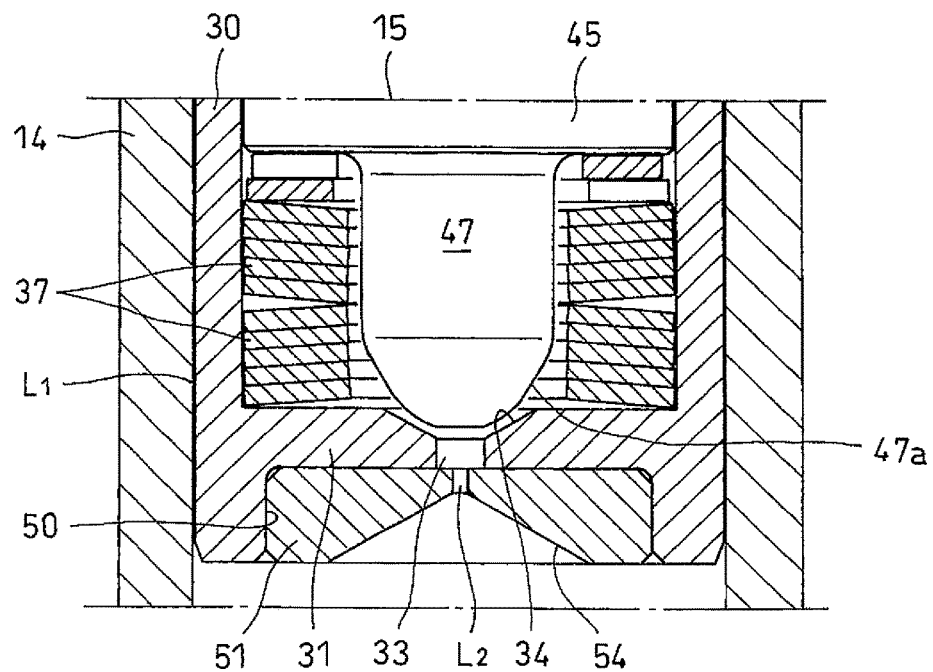
FIG. 8 is a sectional view showing a still different second leakage gap.

In FIG. 8, a disk-shaped fitted member 51 is press-fitted in a circular recess 50 formed in the bottom end of the plunger 30. The fitted member 51 is formed with a tapered recess 54, and a small-diameter orifice, as the second leakage gap $L_2$, through which the tapered recess 54 communicates with the valve hole 33.

Figure 9:
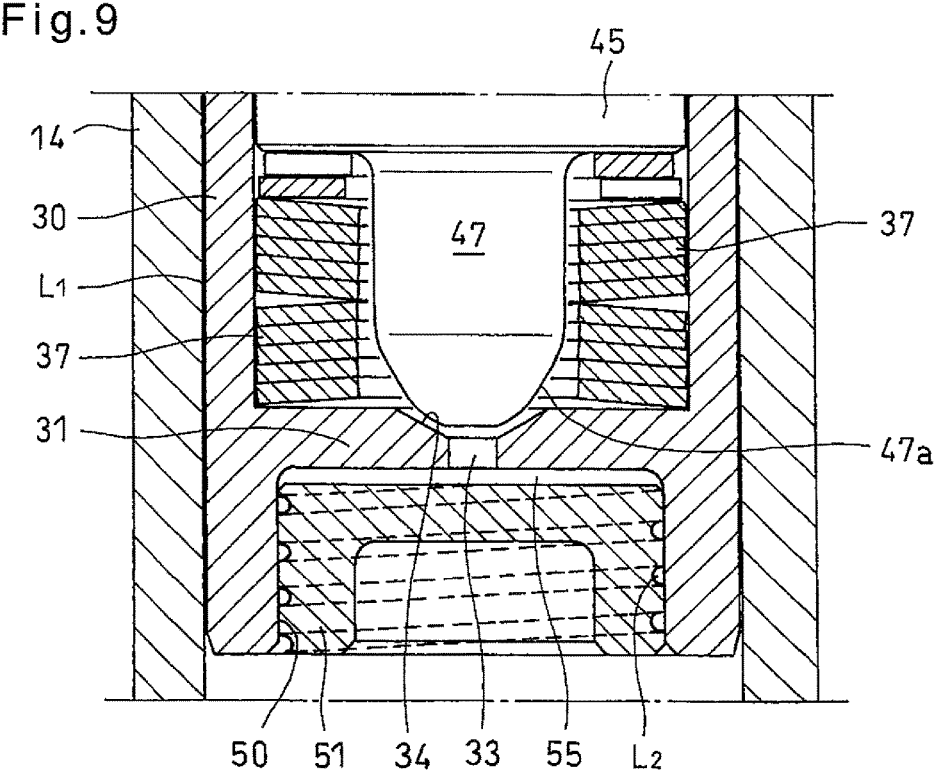
FIG. 9 is a sectional view showing a further different second leakage gap.

In FIG. 9, a cap-shaped fitted member 51 is press-fitted in the circular recess 50 formed at the bottom end of the plunger 30. The fitted member 51 is formed on its outer periphery with a helical groove as the leakage gap $L_2$. Instead of this helical groove, a helical groove may be formed in the radially inner surface of the circular recess 50 as the second leakage gap $L_2$.

In FIG. 2, the plunger 30 is prevented from separating from the rod 15 by bringing the snap ring 42 into abutment with the lower stepped portion 44 of the annular groove 43 formed in the radially outer surface of the rod 15. In an alternative embodiment of FIG. 6, the rod 15 has a flange 45 at its lower portion which is fitted in the plunger 30 with a gap left between the flange 45 and the radially inner surface of the plunger 30 such that the plunger 30 is prevented from separating from the rod 15 by bringing the snap ring 42 into abutment with the top surface or the stepped portion 46 of the plunger 30.

In FIGS. 8 and 9, as in FIG. 6, the plunger 30 is prevented from separating from the rod 15 by bringing the snap ring 42 into abutment with the top surface of the flange 45. In each of the embodiments of FIGS. 6, 8 and 9, the rod 15 includes a columnar valve body 47 provided on the bottom surface of the flange 45. The valve body 47 has a conical surface 47a at its bottom end which is configured to close the valve hole 33 by seating on a tapered valve seat 34 formed above the valve hole 33.

Figure 10:
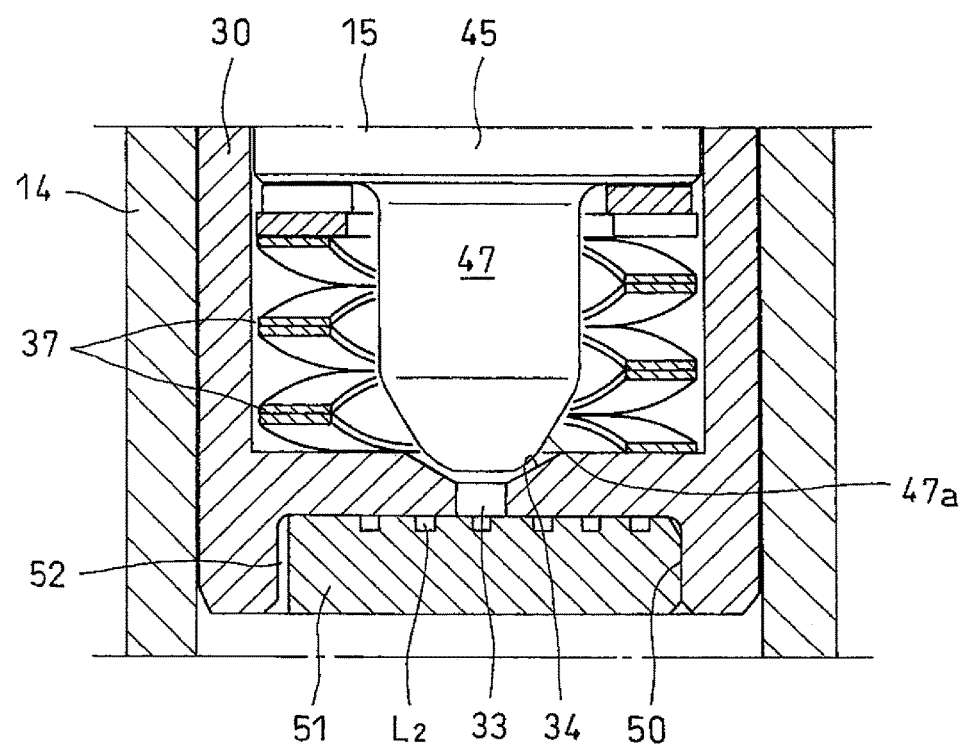
FIG. 10 is a sectional view of an auto-tensioner in which are used wave washers instead of an elastic member shown in FIG. 6.

In each of the embodiments of FIGS. 6, 8 and 9, the elastic member 37 comprises a plurality of disk springs stacked one on another, and the plunger 30 is biased downward by this elastic member 37. Instead, the elastic member 37 may comprise wave washers shown in FIG. 10.

DESCRIPTION OF THE NUMERALS

11. Cylinder
14. Valve sleeve
15. Rod
16. Pressure chamber
17. Spring seat
18. Return spring
24. Reservoir chamber
25. Oil passage
27. Check valve
30. Plunger
31. Bottom plate
33. Valve hole
34. Valve seat
37. Elastic member
40. Anti-separation means
41. Ring groove
42. Snap ring
44. Stepped portion
46. Stepped portion
50. Circular recess
51. Fitted member
54. Tapered recess
$L_1$: First leakage gap
$L_2$: Second leakage gap

What is claimed is:

1. A hydraulic auto-tensioner comprising:
   a cylinder including a bottom having a bottom surface, and a valve sleeve protruding from the bottom surface, the cylinder containing oil;
   a rod having a bottom end portion inserted in the valve sleeve, thereby defining a pressure chamber in the valve sleeve, and provided with a spring seat at an upper portion of the rod;
   a return spring mounted between the spring seat and the bottom surface of the cylinder, and biasing the cylinder and the rod in a direction in which the rod protrudes from the cylinder;
   wherein an oil passage is defined at a bottom portion of the cylinder between an inner periphery of the cylinder and an outer periphery of the valve sleeve such that a lower portion of a reservoir chamber communicates with a lower portion of the pressure chamber through the oil passage; and
   a check valve mounted in a lower end portion of the valve sleeve, and configured to be closed when a pressure in the pressure chamber exceeds a pressure in the reservoir chamber, thereby blocking communication between the pressure chamber and the oil passage, wherein the auto-tensioner is configured such that when a push-in force is applied to the rod, the check valve is closed, causing oil in the pressure chamber to be leaked into the reservoir chamber such that the push-in force is damped by a hydraulic damper function by the oil in the pressure chamber,
   wherein the auto-tensioner further comprises:
   a cylindrical plunger having a bottom plate at a lower portion of the plunger, and fitted to the bottom end portion of the rod so as to be slidable along a radially inner surface of the valve sleeve and a radially outer surface of the rod at the bottom end portion of the rod, wherein a first leakage gap is defined between sliding surfaces of the plunger and the valve sleeve;
   an anti-separation arrangement which prevents separation of the plunger from the rod with a gap defined between the bottom plate of the plunger and a bottom end surface of the rod; and
   an elastic member mounted inside the plunger, and biasing the plunger downward, the elastic member having a spring force smaller than a damper force generated by the first leakage gap,
   wherein the bottom plate of the plunger is formed with a valve hole having a valve seat above the valve hole, and configured to be closed when the valve seat is seated on the bottom end surface of the rod, and
   wherein a second leakage gap of which a flow resistance is lower than a flow resistance of the first leakage gap is provided inside of the plunger.

2. The hydraulic auto-tensioner of claim 1, wherein the second leakage gap comprises an annular gap defined between sliding surfaces of the rod and the plunger.

3. The hydraulic auto-tensioner of claim 2, wherein the first leakage gap has a diametrical dimension of not less than 10 micrometers and less than 20 micrometers, and the second leakage gap has a diametrical dimension of not less than 20 micrometers and less than 60 micrometers.

4. The hydraulic auto-tensioner of claim 1, wherein a damper force generated by the second leakage gap is within a range of ½ to ½₀ of the damper force generated by the first leakage gap.

5. The hydraulic auto-tensioner of claim 1, wherein the plunger is formed, in the lower portion thereof, with a circular recess having a top wall defined by the bottom plate of the plunger, wherein a fitted member is press-fitted in the recess, wherein the second leakage gap is defined between fitting surfaces of the fitted member and the recess, or formed in the fitted member.

6. The hydraulic auto-tensioner of claim 5, wherein the second leakage gap comprises one of a spiral groove, an orifice and a helical groove.

7. The hydraulic auto-tensioner of claim 1, wherein the elastic member comprises one of a coil spring, a disk spring and a wave washer.

8. The hydraulic auto-tensioner of claim 1, wherein the anti-separation arrangement comprises a ring groove formed in an inner periphery of the plunger at an upper portion of the plunger, a snap ring fitted in the ring groove, and a stepped portion provided on the rod and capable of supporting an inner peripheral portion of the snap ring.

9. The hydraulic auto-tensioner of claim 2, wherein a damper force generated by the second leakage gap is within a range of ½ to ½₀ of the damper force generated by the first leakage gap.

10. The hydraulic auto-tensioner of claim 2, wherein the elastic member comprises one of a coil spring, a disk spring and a wave washer.

11. The hydraulic auto-tensioner of claim 5, wherein the elastic member comprises one of a coil spring, a disk spring and a wave washer.

12. The hydraulic auto-tensioner of claim 6, wherein the elastic member comprises one of a coil spring, a disk spring and a wave washer.

13. The hydraulic auto-tensioner of claim 2, wherein the anti-separation arrangement comprises a ring groove formed in an inner periphery of the plunger at an upper portion of the plunger, a snap ring fitted in the ring groove, and a stepped portion provided on the rod and capable of supporting an inner peripheral portion of the snap ring.

14. The hydraulic auto-tensioner of claim 5, wherein the anti-separation arrangement comprises a ring groove formed in an inner periphery of the plunger at an upper portion of the plunger, a snap ring fitted in the ring groove, and a stepped portion provided on the rod and capable of supporting an inner peripheral portion of the snap ring.

15. The hydraulic auto-tensioner of claim 6, wherein the anti-separation arrangement comprises a ring groove formed in an inner periphery of the plunger at an upper portion of the plunger, a snap ring fitted in the ring groove, and a stepped portion provided on the rod and capable of supporting an inner peripheral portion of the snap ring.

16. The hydraulic auto-tensioner of claim 7, wherein the anti-separation arrangement comprises a ring groove formed in an inner periphery of the plunger at an upper portion of the plunger, a snap ring fitted in the ring groove, and a stepped portion provided on the rod and capable of supporting an inner peripheral portion of the snap ring.

\* \* \* \* \*